US009548958B2

(12) United States Patent
Chakra et al.

(10) Patent No.: US 9,548,958 B2
(45) Date of Patent: Jan. 17, 2017

(54) DETERMINING POST VELOCITY (71) Applicant: International Business Machines Corporation, Armonk, NY (US)

(72) Inventors: Al Chakra, Apex, NC (US); Jonathan Dunne, Dungarvan (IE); Liam Harpur, Skerries (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/740,626

(22) Filed: Jun. 16, 2015

(65) Prior Publication Data
US 2016/0373400 A1    Dec. 22, 2016

(51) Int. Cl.
*H04L 12/58* (2006.01)
*G06F 17/28* (2006.01)
*G06F 17/27* (2006.01)

(52) U.S. Cl.
CPC .......... *H04L 51/34* (2013.01); *G06F 17/2765* (2013.01); *G06F 17/2785* (2013.01); *G06F 17/28* (2013.01); *H04L 51/32* (2013.01)

(58) Field of Classification Search
USPC .......................................................... 704/9
See application file for complete search history.

(56) References Cited

U.S. PATENT DOCUMENTS

| | | | | |
|---|---|---|---|---|
| 5,825,855 | A * | 10/1998 | Astarabadi | G10L 15/04 379/67.1 |
| 7,684,990 | B2 * | 3/2010 | Caskey | G10L 15/22 704/255 |
| 8,239,528 | B2 | 8/2012 | Zuzga et al. | |
| 8,825,759 | B1 | 9/2014 | Jackson et al. | |
| 9,189,514 | B1 * | 11/2015 | Myslinski | G06F 17/28 |
| 2005/0010509 | A1 * | 1/2005 | Straub | G06Q 30/02 705/35 |
| 2006/0041456 | A1 * | 2/2006 | Hurewitz | G06Q 10/06 705/35 |
| 2006/0206454 | A1 * | 9/2006 | Forstall | G06F 17/30864 |
| 2006/0235688 | A1 * | 10/2006 | Bicego | G10L 13/04 704/254 |
| 2007/0112612 | A1 * | 5/2007 | Dollens | G06Q 10/06311 705/7.13 |
| 2007/0234277 | A1 * | 10/2007 | Lei | G06F 8/30 717/104 |
| 2010/0017484 | A1 * | 1/2010 | Accapadi | G06Q 10/107 709/206 |
| 2010/0100382 | A1 * | 4/2010 | Rao | G10L 25/78 704/254 |
| 2013/0007155 | A1 * | 1/2013 | Moore | G06Q 10/101 709/206 |

(Continued)

FOREIGN PATENT DOCUMENTS

WO    2010/001406 A1    1/2010

*Primary Examiner* — Marivelisse Santiago Cordero
*Assistant Examiner* — Kevin Ky
(74) *Attorney, Agent, or Firm* — Scully, Scott, Murphy & Presser, P.C.; Damion C. Josephs (57) ABSTRACT Establishing the likely duration and precision with which the post was written is disclosed. An analysis may be used to infer how confident the user is of the subject matter they are writing. A user's post (e.g., response, comment for, but not limited to, a thread, blog, community) may be monitored and its subject matter analyzed to determine benchmark style and speed with which a user can comment.

13 Claims, 3 Drawing Sheets

(56) References Cited

U.S. PATENT DOCUMENTS

| | | |
|---|---|---|
| 2013/0091222 A1 | 4/2013 | Brayman |
| 2014/0082182 A1 | 3/2014 | Doan |
| 2014/0149877 A1 | 5/2014 | Wang et al. |
| 2014/0280106 A1 | 9/2014 | Cierniak et al. |

\* cited by examiner

FIG. 3

DETERMINING POST VELOCITY

FIELD

The present application relates generally to computers and computer applications, and more particularly to online communications and communication sites.

BACKGROUND

When one looks at hand written letters or post-its of people one is familiar with, more than likely one can determine the following: How long the message took to create, the time taken to craft said message taking into account such variables as deviation from an authors expected style, word choice, grammar and so forth. However, when one sees online content on forums, wiki's and other social platforms, one often only sees a post with a timestamp which shows the time at which the post was created. In its current form, it is not easy to ascertain how long the message took to write and the due diligence employed by the author when creating the content.

BRIEF SUMMARY

A method and system of estimating time to compose an electronic correspondence based on subject and target audience may be provided. The method, in one aspect, may include monitoring an originator composing a plurality of content posted on a plurality of social networking systems to a target audience to identify an origination time for each content. The method may also include running a natural language processing (NLP) technique and analytics to analyze the content from the originator to the target audience in the plurality of social networking system. The method may further include determining a content composition target audience style based on analysis performed by running the natural language processing (NLP) technique and analytics. The method may also include determining an average time for the originator to create content based on the content composition target audience style. The method may also include, responsive to receiving a new content by the originator with the content composition target audience style, providing an estimate of the time to compose the new content based on the average time.

A system for estimating time to compose an electronic correspondence based on subject and target audience, in one aspect, may include one or more processors operable to monitor an originator composing a plurality of content posted on a plurality of social networking systems to a target audience to identify an origination time for each content. One or more of the processors may be further operable to run a natural language processing (NLP) technique and analytics to analyze the content from the originator to the target audience in the plurality of social networking system. One or more of the processors may be further operable to determine a content composition target audience style based on analysis performed by running the natural language processing (NLP) technique and analytics. One or more of the processors may be further operable to determine an average time for the originator to create content based on the content composition target audience style. One or more of the processors may be further operable to provide an estimate of the time to compose the new content based on the average time, responsive to receiving a new content by the originator with the content composition target audience style.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system and method may be disclosed that establish the likely duration and precision with which the post was written. That analysis may be used to infer how confident the user is of the subject matter they are writing. For example, analysis of User J's behavior over 6 months shows that one post in particular was written much slower than others, and there were a number of sentences rephrased. From this analysis, it may be inferred that User J may have been unsure about the subject matter. Methodologies or techniques are presented that may identify the length of time and precision used to create a specific post.

An advantage provided by the methodology of the present disclosure in one embodiment may include allowing users to have the ability to have more insight into a post without an invasive monitoring system. In addition, in a social context, users can share this information with other users with whom they have a social connection. Subsequently those users can leverage this information in advance of posting and/or reading content, thus enhancing their experience.

In one embodiment, a system and method is presented for estimating processing time to compose a post. In one embodiment, the processing time to compose a post may be estimated based on a topic using natural language processing and semantic analysis including the velocity and taking into account various edit attempts.

As web based communication services are used by more consumers, there is a need for the end user to understand an expected time to post via a particular web based communication application, e.g., thread/blog/community). Specifically, the time taken to post content may be articulated and used to enhance productivity. For example, if a user has a specific deadline, one can establish that expected time to complete either one or a series of posts based on prior analysis. If the user does have an expected time to deliver a post on a given topic which is well in excess of a given deadline, business decisions can be motivated around the suitability of these activities. In one aspect, the system and method of the present disclosure is non-invasive or non-intrusive.

A system and/or method of the present disclosure in one embodiment may monitor a user's post (e.g., response/comment for, but not limited to, a thread/blog/community) and its subject matter to determine benchmark style and speed with which a user can comment. For example, using a natural language processing technique and semantic analysis, a post may be scored for style and composition based on the content of the post and its target audience. Additional factorial analysis may be implemented, which combines the above factors to derive a novel composition quotient. This quotient may be used to drive business decisions around the expected time required for a user to create a post based on the target forum, subject matter and recipient.

The system and/or method, in one aspect, provide a mechanism for end users to establish the likely duration and precision with which the post was written. For example, the expected time taken for an author to create a post may be determined.

Figure 1:
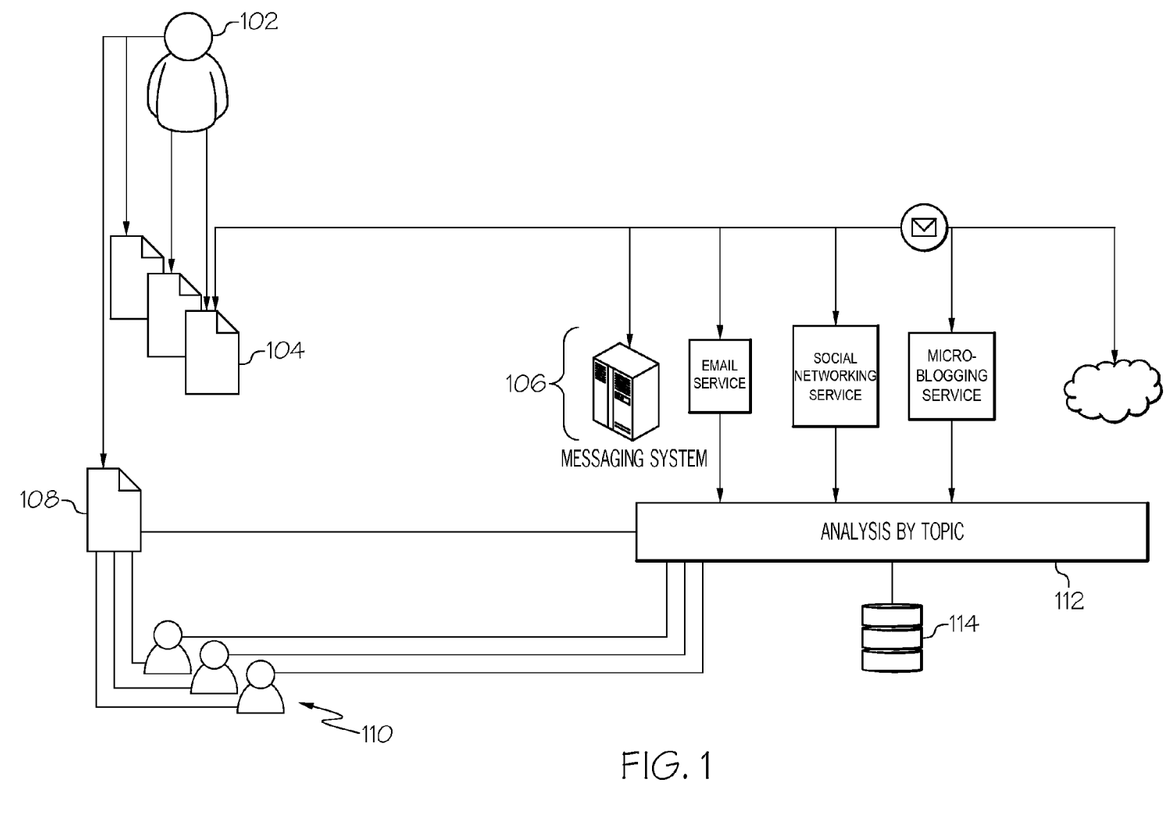
FIG. 1 is a diagram illustrating analytical components of a system in one embodiment of the present disclosure.

FIG. 1 is a diagram illustrating analytical components of a system in one embodiment of the present disclosure. For instance, the system of the present disclosure may use existing logs and/or repository sources, e.g., instant messaging (IM), chat room, wiki, blogs, and others to determine overall timings.

Referring to FIG. 1, Users J, P, G and R may use online communication medium, e.g., online wiki, blog, social community site, email system, messaging system, and the like to communicate with other online, e.g., post or write content, comment on a post, and the like. For example, User J 102 may have written a number of messages/content 104 via one or more online communication sites (e.g., 106). User J 102 may also post a message or content 108 directed to one or more recipients, e.g., User P, G and R 110. The message or content 108 may be analyzed by topic by an analysis engine or module 112, for example, using NPL and semantic analysis techniques. The analysis in one embodiment may determine a topic associated with a post. The analyzed content may be stored in an analysis repository 114, for example, a database stored in a storage device.

TABLE 1 illustrates an example of extracted data based on analyzing users' posts.

| User | Post type | Target audience | Total composition time (sec) | Average sentence length (in words) | Average Pause time between words (Sec) | Average Pause time between sentences (sec) |
|---|---|---|---|---|---|---|
| User J | IM | Personal | 120 | 10 | 0.5 | 3 |
| User P | Forum | Business | 600 | 15 | 2 | 7 |
| User G | Blog | Business | 800 | 17 | 5 | 7 |
| User R | Wiki | Legal | 3600 | 26 | 3 | 10 |

Leveraging NLP and semantic analysis for each post, each post may be scored for style and composition based on the target audience of the post or documents intended for the target audience. For instance, using NLP, the methodology of the present disclosure may establish a style categorization based on the language and language type used to establish the potential intended audience for such post. Similarly the methodology of the present disclosure may establish a scoring model based on the complexity. For example, how did the author get to the point the author is trying to articulate, are some words only available in specialized dictionary, e.g., did the author explain specialized terms, words like; "nano", "Feynman diagrams", or "supersymmetry" or did the author assume that the reader already has such knowledge. From such key word elements, NLP can summarize then categorize and add a score.

Using the above determined timings and an NLP assessment (e.g., scores), a coefficient may be derived based on, for example, the poster, the intended audience, the time taken to compose the post and the subject matter. Other attributes or factors may be used to derive the coefficient. For example, once a base-line score is established, the process becomes easier by using the coefficient in terms of relativity to a previous post's score, as a multiple of the previous post's score, for example, 5 times (x) or 6 times (x) the previous post's score.

Expected post velocity time=54.5+User (23.6)+Post_type (35.6)+Audience (456.3)+comp_time (45.2)+avg_sent_lth (456.1)+avg_wrd_pause_time (12.1)+avg_sent_pause_time (1.1)*nlp_post_proficiency (80%).

Expected post velocity time represents the likely amount of time the user spent composing this message or post. The first term in the above formula represents a baseline score. The scores associated with User, Post_type (post type), Audience (target audience), comp_time (Total composition time, e.g., in seconds), avg_sent_lth (average sentence length, e.g., in number of words), avg_wrd_pause_time (Average Pause time between words, e.g., in seconds), avg_sent_pause_time (Average Pause time between sentences, e.g., in seconds) may be determined based on NLP and semantic analysis. Nlp_post_proficiency represents proficiency level associated with a post compared to other posts of similar topic. For instance, if on average, it takes user A 20 minutes to compose a physics topic related post established by 10 previous posts, and this past time it took 10 minutes, then the Nlp_post_proficiency is (50%).

A pattern may be ascertained that can be applied to content, that is likely to have no start and end times, e.g., non Instant Messaging communication), so that one can establish the likely duration and precision. For instance, a pattern may be considered as a calculation of interruptions versus dedicated time to the specific task. For example, every day at 11:00 AM, user A becomes very busy answering questions from a colleague in a remote location through an instant messaging application. Such distraction takes 10 minutes. The methodology of the present disclosure establishes a pattern and configures such distraction into the formula.

Figure 2:
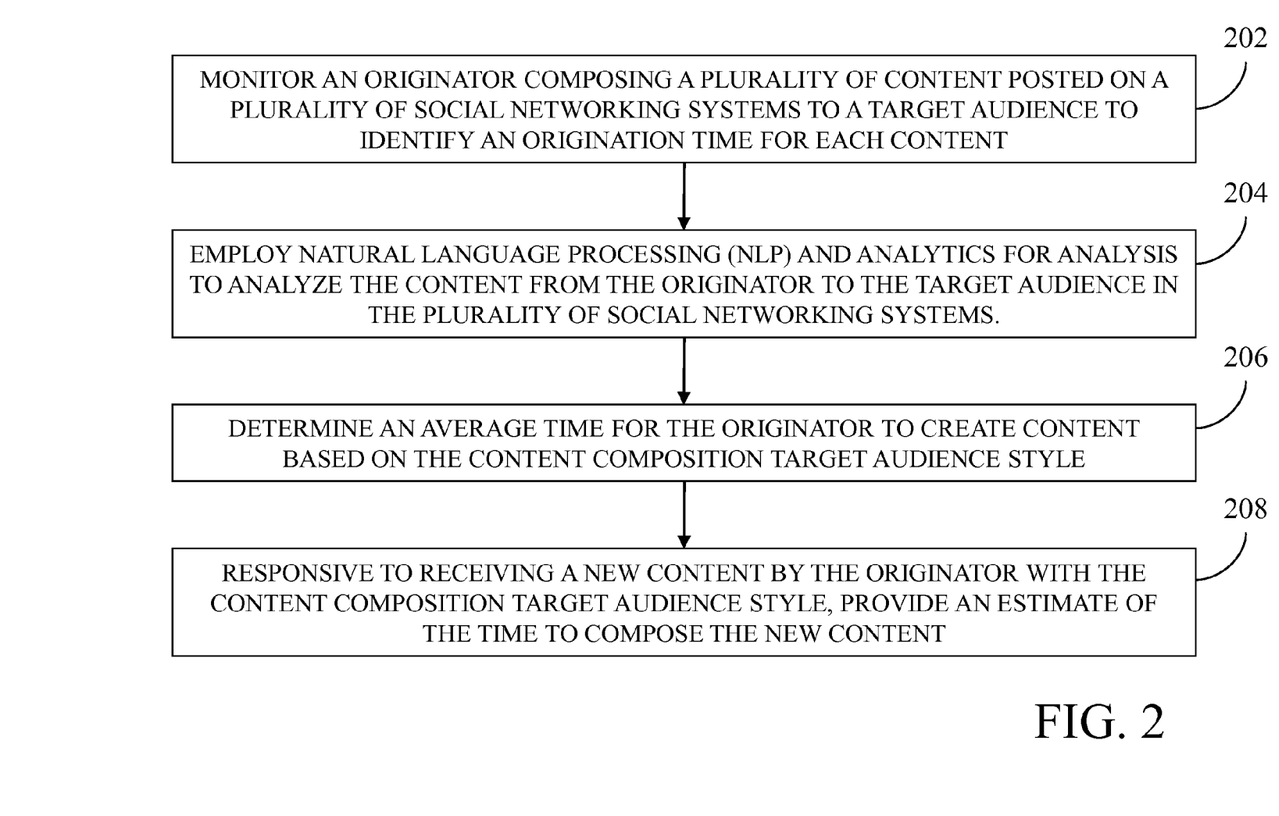
FIG. 2 is a flow diagram illustrating a method of estimating time to compose an electronic correspondence based on subject and target audience in one embodiment of the present disclosure.

FIG. 2 is a flow diagram illustrating a method of estimating time to compose an electronic correspondence based on subject and target audience in one embodiment of the present disclosure.

At 202, an originator composing a plurality of content posted on a plurality of social networking systems to a target audience is monitored to identify an origination time for each content. For instance, a monitoring engine may monitor each post. One would be a learning task to establish a base-line for each of the target social network as to how long it took for the intended audience to consume it.

At 204, natural language processing (NLP) and analytics for analysis may be employed to analyze the content from the originator to the target audience in the plurality of social networking systems. This analysis may determine a content composition target audience style.

At 206, an average time for the originator to create content is determined based on the content composition target audience style. The methodology of the present disclosure in one embodiment may determine if the upcoming target audience style has been posted before. If yes, a time line may be established based on historical data. If it is determined that this target audience style is new to the author, the methodology of the present disclosure in one embodiment may create a proximity score to a style that is a part of the historical data, from which the methodology of the present disclosure in one embodiment can predict the difficulty score and derive from that the time delta.

At 208, responsive to receiving a new content by the originator with the content composition target audience style, an estimate of the time to compose the new content may be provided, for instance, to an estimating engine.

In one aspect, examples of the factors for estimating the time to compose the new content based on the target audience may include social networking system type, target audience, average sentence length in words, average pause time between words, and average pause time between sentences.

The social networking system type may include one or more of instant messaging (IM), short message services (SMS), blog, web site, online social community, news feed, electronic mail (e-mail), wiki, and others.

In one aspect, the above method allows for estimating a response time to a request for information on a requesting social networking system by the originator based on the request, the target audience, and the requesting social networking system.

The estimated response time to the request for information may be utilized by a business processing modeling (BPM) system.

Figure 3:
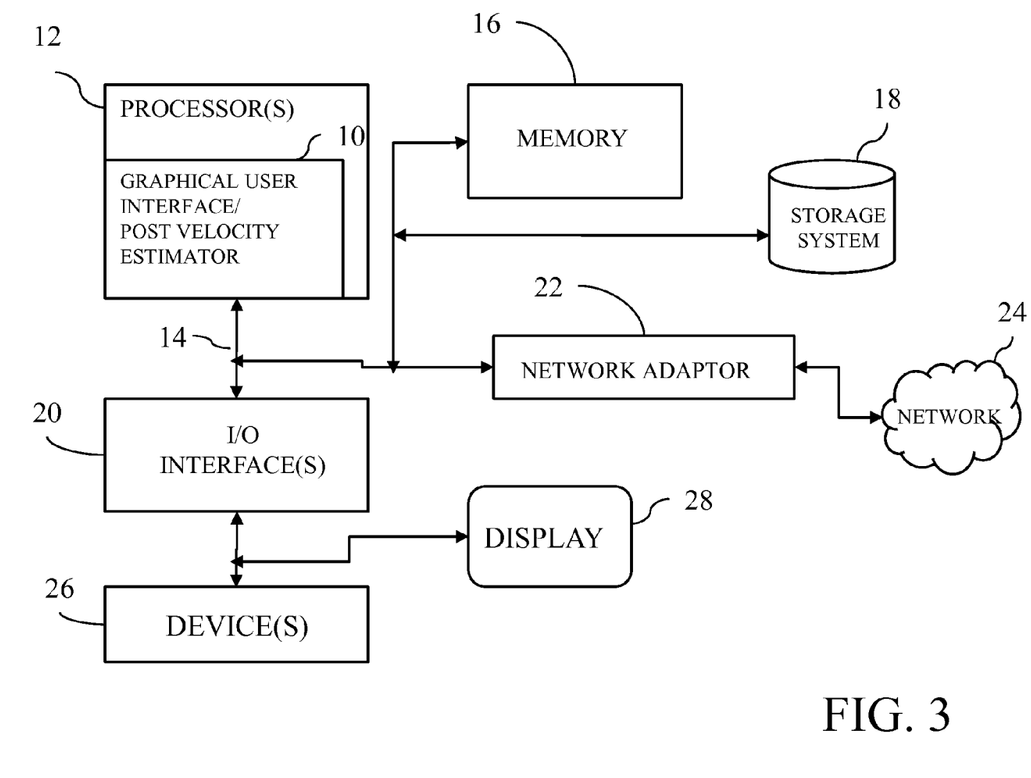
FIG. 3 illustrates a schematic of an example computer or processing system that may implement a post velocity estimation system in one embodiment of the present disclosure.

FIG. 3 illustrates a schematic of an example computer or processing system that may implement a post velocity estimation system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of estimating time to compose an electronic correspondence based on subject and target audience, comprising:
   monitoring an originator composing a plurality of content posted on a plurality of social networking systems to a target audience to identify an origination time for each content;
   running, by a processor, a natural language processing (NLP) technique and analytics to analyze the content from the originator to the target audience in the plurality of social networking system;
   determining a content composition target audience style based on analysis performed by running the natural language processing (NLP) technique and analytics;
   extracting average sentence length in words, average pause time between words, and average pause time between sentences associated with the content by running the natural language processing (NLP) technique and the analytics;
   determining an average time for the originator to create content based on the content composition target audience style, the average sentence length in words, the average pause time between words, and the average pause time between sentences; and
   responsive to receiving a new content by the originator with the content composition target audience style, providing an estimate of the time to compose the new content based on the average time.

2. The method of claim 1, wherein the social networking system type comprises at least one selected from the group consisting of instant messaging (IM), short message services (SMS), blog, web site, online social community, news feed, electronic mail (e-mail), and wiki.

3. The method of claim 1, wherein a response time to a request for information on a requesting social networking system by the originator is estimated based on the request, the target audience, and the requesting social networking system.

4. The method of claim 1, where the estimated response time to the request for information is provided to a business processing modeling (BPM) system.

5. A computer readable storage medium storing a program of instructions executable by a machine to perform a method of estimating time to compose an electronic correspondence based on subject and target audience, comprising:
   monitoring an originator composing a plurality of content posted on a plurality of social networking systems to a target audience to identify an origination time for each content;
   running, by a processor, a natural language processing (NLP) technique and analytics to analyze the content from the originator to the target audience in the plurality of social networking system;
   determining a content composition target audience style based on analysis performed by running the natural language processing (NLP) technique and analytics;
   extracting average sentence length in words, average pause time between words, and average pause time between sentences associated with the content by running the natural language processing (NLP) technique and the analytics;
   determining an average time for the originator to create content based on the content composition target audience style, the average sentence length in words, the average pause time between words, and the average pause time between sentences; and
   responsive to receiving a new content by the originator with the content composition target audience style, providing an estimate of the time to compose the new content based on the average time.

6. The computer readable storage medium of claim 5, wherein the social networking system type comprises at least one selected from the group consisting of instant messaging (IM), short message services (SMS), blog, web site, online social community, news feed, electronic mail (e-mail), and wiki.

7. The computer readable storage medium of claim 5, wherein a response time to a request for information on a requesting social networking system by the originator is estimated based on the request, the target audience, and the requesting social networking system.

8. The computer readable storage medium of claim 5, where the estimated response time to the request for information is provided to a business processing modeling (BPM) system.

9. A system for estimating time to compose an electronic correspondence based on subject and target audience, comprising:
   at least one hardware processor monitoring an originator composing a plurality of content posted on a plurality of social networking systems to a target audience to identify an origination time for each content,
   the at least one hardware processor running a natural language processing (NLP) technique and analytics to analyze the content from the originator to the target audience in the plurality of social networking system,
   the at least one hardware processor determining a content composition target audience style based on analysis performed by running the natural language processing (NLP) technique and analytics,
   the at least one hardware processor extracting average sentence length in words, average pause time between words, and average pause time between sentences associated with the content by running the natural language processing (NLP) technique and the analytics;
   the at least one hardware processor determining an average time for the originator to create content based on the content composition target audience style, the average sentence length in words, the average pause time between words, and the average pause time between sentences
   responsive to receiving a new content by the originator with the content composition target audience style, the at least one hardware processor providing an estimate of the time to compose the new content based on the average time.

10. The system of claim 9, wherein one or more factors for estimating the time to compose the new content comprises at least one factor selected from the group consisting of social networking system type, target audience, average sentence length in words, average pause time between words, and average pause time between sentences.

11. The system of claim 10, wherein the social networking system type comprises at least one selected from the group consisting of instant messaging (IM), short message services (SMS), blog, web site, online social community, news feed, electronic mail (e-mail), and wiki.

12. The system of claim 10, wherein a response time to a request for information on a requesting social networking system by the originator is estimated based on the request, the target audience, and the requesting social networking system.

13. The system of claim 10, where the estimated response time to the request for information is provided to a business processing modeling (BPM) system.

* * * * *